United States Patent
Nelemans et al.

(10) Patent No.: US 8,728,317 B2
(45) Date of Patent: May 20, 2014

(54) DEVICE SUITABLE FOR TREATING A FLUID, AS WELL AS A METHOD SUITABLE FOR MANUFACTURING SUCH A DEVICE

(75) Inventors: Bert J. Nelemans, Spaubeek (NL); Hendrikus J. Van Sonsbeek, Hulst (NL)

(73) Assignee: AKA Patenten B.V., Sittard (NL)

( * ) Notice: Subject to any disclaimer, the term of this patent is extended or adjusted under 35 U.S.C. 154(b) by 581 days.

(21) Appl. No.: 13/055,741

(22) PCT Filed: Jul. 21, 2009

(86) PCT No.: PCT/NL2009/050449
§ 371 (c)(1),
(2), (4) Date: Apr. 12, 2011

(87) PCT Pub. No.: WO2010/011138
PCT Pub. Date: Jan. 28, 2010

(65) Prior Publication Data
US 2011/0186416 A1 Aug. 4, 2011

(30) Foreign Application Priority Data

Jul. 25, 2008 (NL) .................................. 1035752

(51) Int. Cl.
*B01D 63/14* (2006.01)
*C02F 1/00* (2006.01)

(52) U.S. Cl.
CPC ............ *B01D 63/14* (2013.01); *B01D 2201/12* (2013.01)
USPC ................. 210/321.86; 210/486; 210/487

(58) Field of Classification Search
CPC ............... B01D 63/14; B01D 2201/12; B01D 2201/127
See application file for complete search history.

(56) References Cited

U.S. PATENT DOCUMENTS

| | | | |
|---|---|---|---|
| 4,075,106 A * | 2/1978 | Yamazaki | 210/487 |
| 4,199,457 A * | 4/1980 | Esmond | 210/321.77 |
| 4,265,302 A | 5/1981 | Forster et al. | |
| 4,274,964 A * | 6/1981 | Krick et al. | 156/204 |
| 4,556,489 A | 12/1985 | Diettrich, Jr. et al. | |
| 5,460,720 A * | 10/1995 | Schneider | 210/321.86 |
| 5,527,569 A * | 6/1996 | Hobson et al. | 428/35.2 |

FOREIGN PATENT DOCUMENTS

| | | |
|---|---|---|
| EP | 0040890 A1 | 12/1981 |
| EP | 0122022 | 10/1984 |
| EP | 0591116 | 4/1994 |
| EP | 0591116 A1 | 4/1994 |
| EP | 1541952 | 6/2005 |

(Continued)

OTHER PUBLICATIONS

International Search Report completed by the EP Searching Authority on Oct. 22, 2009 concerning PCT/NL2009/050449.

*Primary Examiner* — Katherine Zalasky
(74) *Attorney, Agent, or Firm* — Barnes & Thornburg LLP (57) ABSTRACT

A device which is suitable for treating a fluid comprises an elongated foil formed of a plurality of foil layers arranged in zigzag fashion, wherein a first foil layer is connected to a second foil layer at a first end. The second foil layer is connected to a third foil layer at a second end remote from the first end. Spacers are arranged between said foil layers. The spacer comprises a mesh-like layer, through which fluid can flow in the plane of the mesh-like layer as well as transversely to the plane of the mesh-like layer.

10 Claims, 10 Drawing Sheets

(56) References Cited

FOREIGN PATENT DOCUMENTS

| | | |
|---|---|---|
| EP | 1541952 A1 | 6/2005 |
| JP | 53114809 | 10/1978 |
| JP | 59209351 | 11/1984 |
| JP | 62-93573 U | 6/1987 |
| JP | 06190249 | 7/1994 |
| JP | 09152284 | 6/1997 |
| JP | 200870107 | 3/2008 |
| RU | 2029610 | 2/1995 |
| RU | 2029619 | 2/1995 |
| RU | 2032453 | 4/1995 |
| WO | 2007/122909 A1 | 11/2007 |

* cited by examiner

DEVICE SUITABLE FOR TREATING A FLUID, AS WELL AS A METHOD SUITABLE FOR MANUFACTURING SUCH A DEVICE

CROSS REFERENCE TO RELATED APPLICATIONS

This application is a U.S. national counterpart application of international application serial No. PCT/NL2009/050449 filed Jul. 21, 2009, which claims priority to Netherlands Patent Application No. 1035752 filed Jul. 25, 2008. The entire disclosures of PCT/NL2009/050449 and NL 1035752 are hereby incorporated by reference.

The invention relates to a device suitable for treating a fluid, which device comprises an elongated foil formed of a plurality of foil layers arranged in zigzag fashion, a first foil layer being connected to a second foil layer at a first end, and said second foil layer being connected to a third foil layer at a second end remote from said first end, whilst spacers are arranged between said foil layers.

The invention further relates to a method suitable for manufacturing such a device.

Such devices are suitable for transferring heat from a first fluid to a second fluid, with the device functioning as a heat exchanger. The foil is a heat-conducting foil in that case.

Such devices are furthermore suitable for use as filters, in which a substance is transferred from a first fluid to a second fluid. It is also possible to use the device as an air humidifier. The foil is a membrane foil in that case.

In such a device, which is known from European patent application EP-A1-0.040.890, beam-shaped spacer elements disposed near the first end, the second end and the next ends keep the foil layers apart. Such beam-shaped spacer elements are also disposed between the ends.

A drawback of such spacer elements is that there are relatively many places on the surface of a foil layer where fluid flowing over the foil layer is practically stationary. As a result, the transfer of heat or the transfer of the material to be filtered is not optimal.

The object of the invention is to provide a device in which a turbulent flow can be realised over substantially the entire area of the foil layer so as to optimise the transfer of matter and/or heat.

This object is accomplished with the device according to the invention in that said spacer comprises a mesh-like layer, through which fluid can flow in the plane of the mesh-like layer as well as transversely to the plane of the mesh-like layer.

Because of the presence of the mesh-like layer, the fluid will spread over the entire surface area of the foil layer in use, whilst a good contact with the foil layers of the elongated foil disposed on either side of the mesh-like layer is at the same time ensured.

One embodiment of the device according to the invention is characterised in that longitudinal sides of the first foil layer and the second foil layer are interconnected by means of a cement along at least part of the length.

The cement provides a proper adhesive bond between the foil layers. In addition, because of the use of the cement the connection is flexible and capable of taking up expansions of the foil layers. The cement is a silicone paste, a silicone hot melt or an epoxy resin, for example. The cement interconnects the foil layers and seals the space present between the foil layers. In case of a pressure buildup in the space present between the foil layers on account of the fluid present therein, said pressure buildup can readily be taken up by the cement. Besides silicone paste, it is also possible to use other types of cement capable of providing a proper adhesive bond with the foil layers, taking up expansion of the foil layers and adequately sealing the space present between the foil layers for fluid present in said space.

Another embodiment of the device according to the invention is characterised in that longitudinal sides of the first foil layer and the second foil layer are interconnected up to a point spaced a predetermined distance from the first end, leaving open a passage, whilst longitudinal sides of the second foil layer and the third foil layer are interconnected up to a point spaced a predetermined distance from the second end, leaving open a passage.

Via said passages, a fluid can be introduced into the space present between the foil layers in a simple manner. Preferably, such passages are located near the two longitudinal sides, so that a fluid can be introduced into or be discharged from the space between the foil layers from two sides. In this way an adequate flow distribution through the mesh-like layer is obtained.

Yet another embodiment of the device according to the invention is characterised in that longitudinal sides of the foil layers arranged in zigzag fashion are connected to the mesh-like layer.

By interconnecting the foil layers and the mesh-like layer, a proper seal of the longitudinal sides is obtained in a simple manner. When the foil layers and the mesh-like layers are being interconnected by means of a cement, the connection between the foil layers and the mesh-like layer is realised at the same time upon application of the cement. Thus, a fluid present between the foil layers will have to flow through the mesh-like layer at all times.

Yet another embodiment of the device according to the invention is characterised in that the mesh-like layer extends over substantially the entire area of a foil layer.

Because the mesh-like layer extends over substantially the entire area of the foil layer, a relatively large turbulent flow is created over the entire area of the layer.

Yet another embodiment of the device according to the invention is characterised in that a passage extending transversely to the longitudinal side is present between the first and the second foil layer near the second end.

This passage has been automatically obtained as a result of the foil layer being arranged in zigzag fashion. Through said passage, a fluid can be introduced between the layers over the entire width of the elongated foil, after which the fluid can be discharged via the passages located near the first end and at the longitudinal sides, or vice versa. As a result, a good flow distribution over the entire area of the foil layer is realised.

Yet another embodiment of the device according to the invention is characterised in that the foil layers are disposed within a cylindrical container, with the first and the second end extending in axial direction, whilst the foil layers extend in spiral fashion from the first end located near the central axis of the cylindrical container to the second end spaced some distance from said central axis.

The cylindrical container makes it possible to ensure and control a good pressure and/or flow distribution of the fluids flowing through the cylindrical container when relatively high pressures are used.

The invention also relates to a method for manufacturing such a device.

This object is accomplished with the method according to the invention in that a mesh-like layer is positioned on a part of an elongated foil forming a first foil layer, after which a part forming a second foil layer is positioned on said mesh-like layer, which first and which second foil layer are interconnected with a first end.

Using such a method, it is possible in a relatively simple manner to realise a device for treating a fluid which is capable of functioning in an entirely automated fashion.

The invention will now be explained in more detail with reference to the drawings, in which:

FIGS. 8-10B show various views of a second embodiment of the device according to the invention;

Like parts are provided with the same numerals in the figures.

Figure 1:
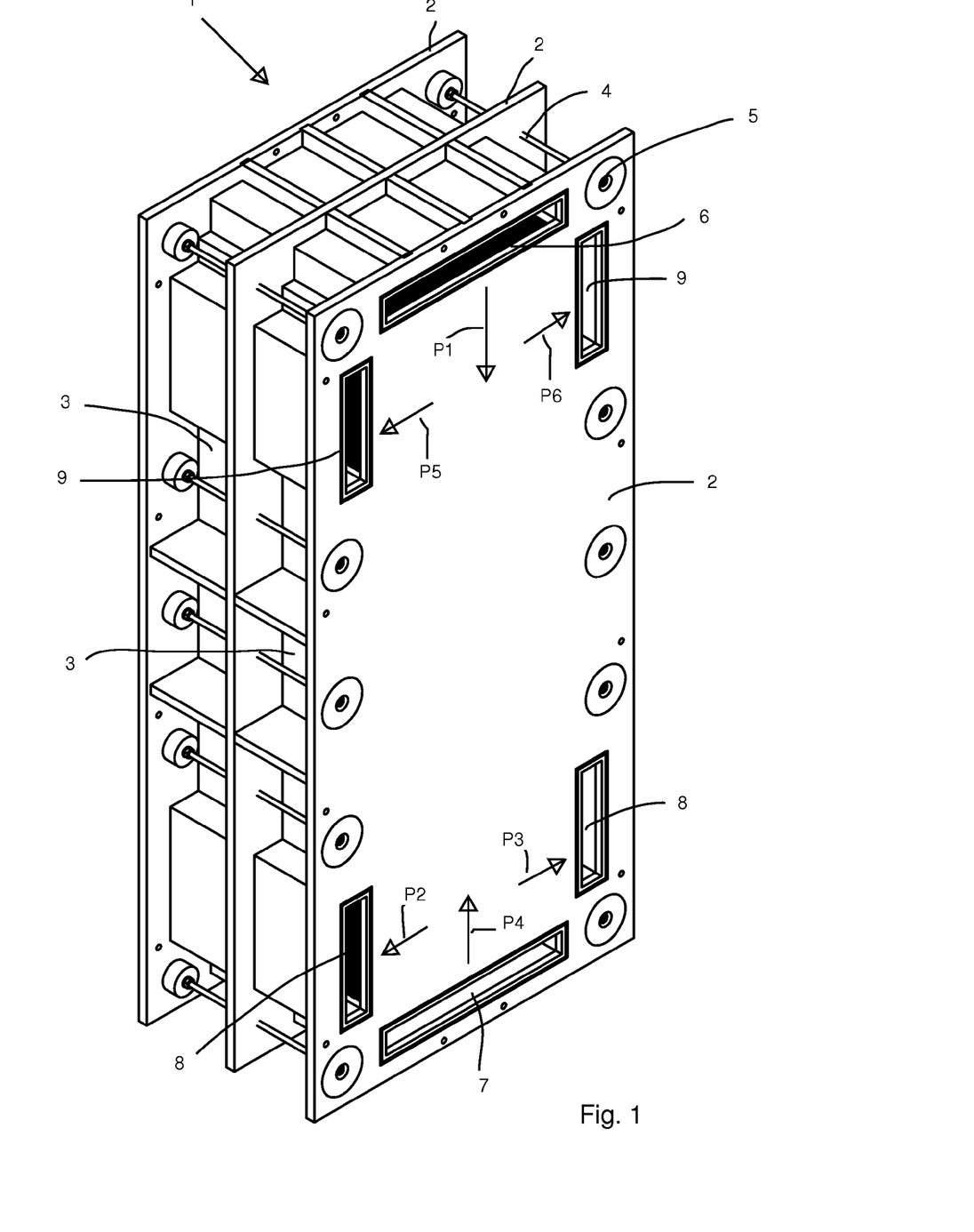
FIG. 1 is a perspective view of a device according to the invention.

FIG. 1 shows a device 1 according to the invention, which comprises a number of spaced-apart plates 2, whilst an elongated foil is present between two opposite plates 2, which foil is formed in a plurality of foil layers arranged in zigzag fashion. Spacers are disposed between the foil layers. The foil and the spacers will be explained in more detail with reference to FIGS. 3A-6B.

Sealing plates 3 are arranged around the elongated foil and the spacer. The plates 2 and the foils and spacers present therebetween are joined together by means of stud bolts 4 and nuts 5 screwed onto ends thereof. The plates 2 are provided with first and second fluid inlet openings 6, 7, as well as with first and second fluid outlet openings 8, 9. A first fluid is introduced between the elongated foil layers via the first fluid inlet opening 6 and subsequently transported in the direction indicated by the arrow P1 to the first fluid outlet openings 8, where the fluid is first transported in the directions indicated by the arrows P2, P3, after which it will flow from the first fluid outlet openings 8. In a similar manner, a second fluid is introduced between other layers of the foil in the direction indicated by the arrow P4 via the second fluid inlet opening 7 and transported to the second outlet openings 9, where the fluid flows from the second fluid outlet openings 9 in the directions indicated by the arrows P5, P6.

Figure 2:
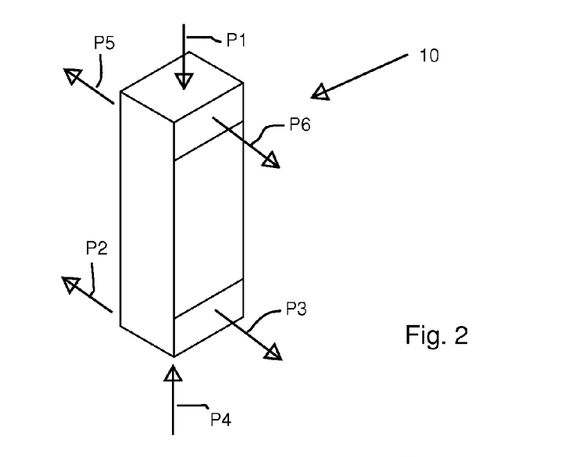
FIG. 2 schematically shows part of the device shown in FIG. 1.

FIG. 2 shows a module 10, with layers present between the plates 2 of FIG. 1 and spacers present between said layers (schematically indicated), as well as the flow directions of the fluids indicated by the arrows P1-P6. It is also possible, of course, to reverse the flow directions P1-P3 and/or P4-P6 and realise a counterflow module or a parallel flow module 10.

Figure 3A:
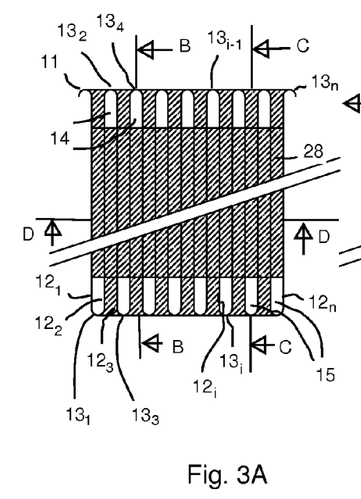
FIG. 3A is a cross-sectional view of the part of the device shown in FIG. 2.
Figure 3B:
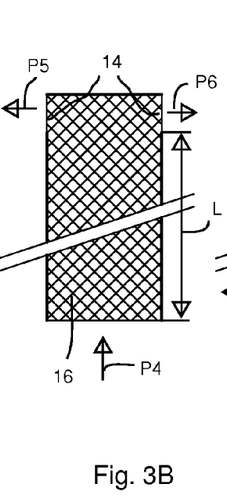
FIG. 3B is a sectional view in the direction indicated by the arrows B-B in FIG. 3A.
Figure 3C:
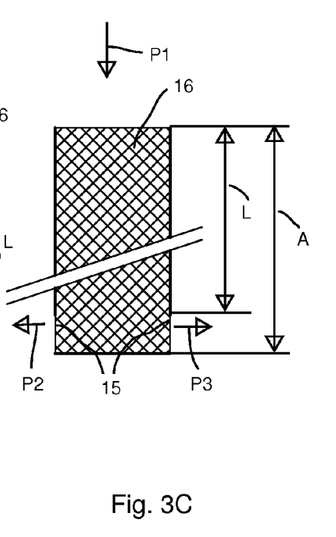
FIG. 3C is a sectional view in the direction indicated by the arrows C-C in FIG. 3A.

FIG. 3A is a cross-sectional view of the module 10 shown in FIG. 2, in which the elongated foil 11 and the zigzag foil layers $12_1, 12_2, 12_3 \ldots 12_n$ are clearly distinguishable. The first foil layer $12_1$ is connected to the second foil layer $12_2$ near a first end $13_1$, which second foil layer is connected to the third foil layer $12_3$ on a side remote from the first end $13_1$. Each foil layer $12_i$ is thus connected to a next foil layer $12_{i+1}$ at one end $13_i$ and to a preceding foil layer $12_{i-1}$ at another end $13_{i-1}$. The foil layers are interconnected over a distance L at points spaced from the ends $13_1 \ldots 13_n$, which distance L is smaller than the distance A between two opposite ends $13_1, 13_2$. Passages 14, 15 are formed by the foil layers $12_1 \ldots 12_n$, which are not connected near the ends $13_1$-$13_n$, via which passages the second fluid and the first fluid, respectively, can flow from the module 10.

Present between the foil layers $12_1 \ldots 12_n$ are mesh-like layers 16 (see also FIGS. 6A-6B), which extend over the entire area of a foil layer $12_1 \ldots 12_n$. The mesh-like layer 16 is formed by two sets of synthetic yarns 17, 18, which each include an angle of preferably 15°-45° with the longitudinal direction of the foil layers. The mesh-like layer 16 forms a so-called spacer.

Figure 6A:
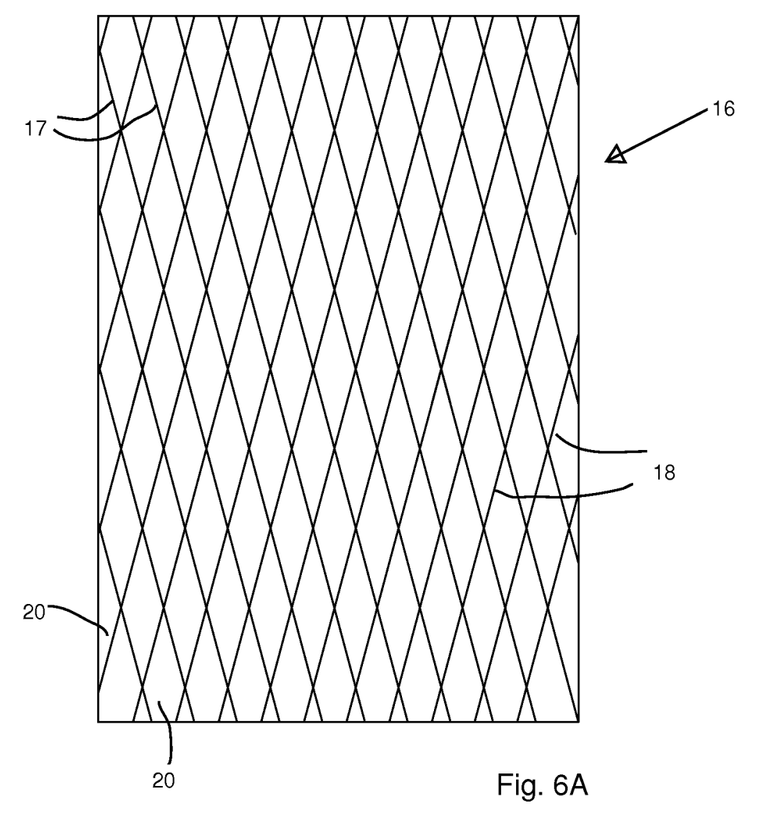
FIGS. 6A and 6B show a top plan view and a cross-sectional view, respectively, of a mesh-like layer of the device shown in FIG. 1.
Figure 6B:
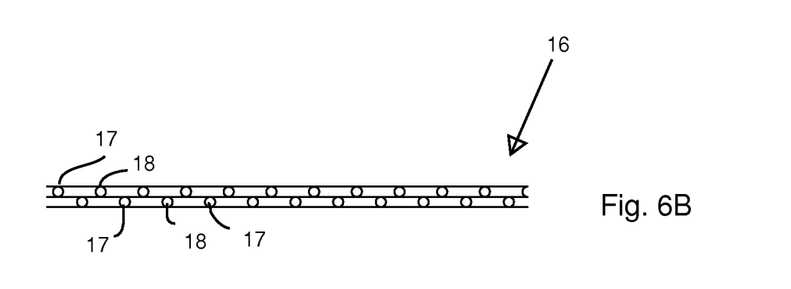

The yarns 17, 18 are preferably 0.5-2.5 mm thick. The mesh-like layer thus has a thickness of about 1-5 mm, in particular at locations where two yarns 17, 18 intersect. Mesh-like openings 20 are present between the yarns 17, 18, with a ratio between the area of the openings 20 in relation to the area of the yarns 17, 18 of about 80% to 20%. When fluid flows through the mesh-like layer 16, the length of flow is substantially the same at all locations and preferred flows and various pressure drops do not occur.

The mesh-like layer 16 is disposed between two opposite foil layers $12_1, 12_2$, with the foil layers $12_1 \ldots 12_n$ and the mesh-like layers 16 being drawn together by the plates 2, the stud bolts 4 and the nuts 5 in such a manner that a fluid flow through the mesh-like layer 16 can only take place through the openings 20 and over and under the yarns 17, 18. Because the yarns 17, 18 are relatively thin, contact between the fluid and the foil layer $12_1 \ldots 12_n$ takes place over the entire area of the foil layer $12_1 \ldots 12_n$. The fluid flow over the surface of the foil layer $12_1 \ldots 12_n$ takes place in a turbulent manner caused by the yarns 17, 18. As a result, a further improved transmission of matter and/or heat between the fluid and the foil layers $12_1 \ldots 12_n$ is obtained with a relatively low pressure drop across the mesh-like layer 16.

Figure 4:
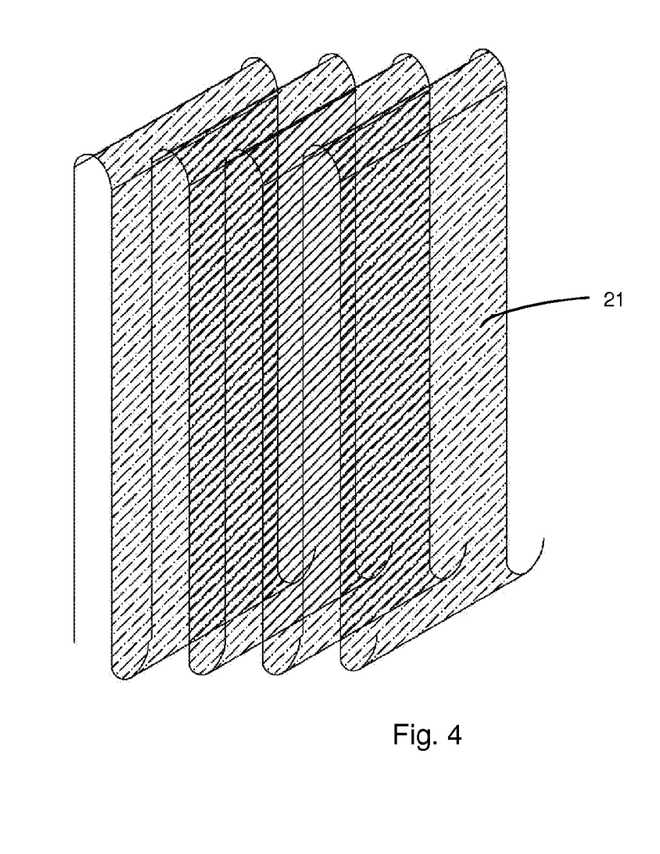
FIG. 4 is a perspective view of an elongated foil formed in a plurality of foil layers arranged in zigzag fashion, which foil comprises a membrane.

FIG. 4 shows an embodiment of a foil 21 comprising a plurality of foil layers arranged in zigzag fashion, which foil is made of a membrane foil which is permeable to specific desired substances.

Figure 5:
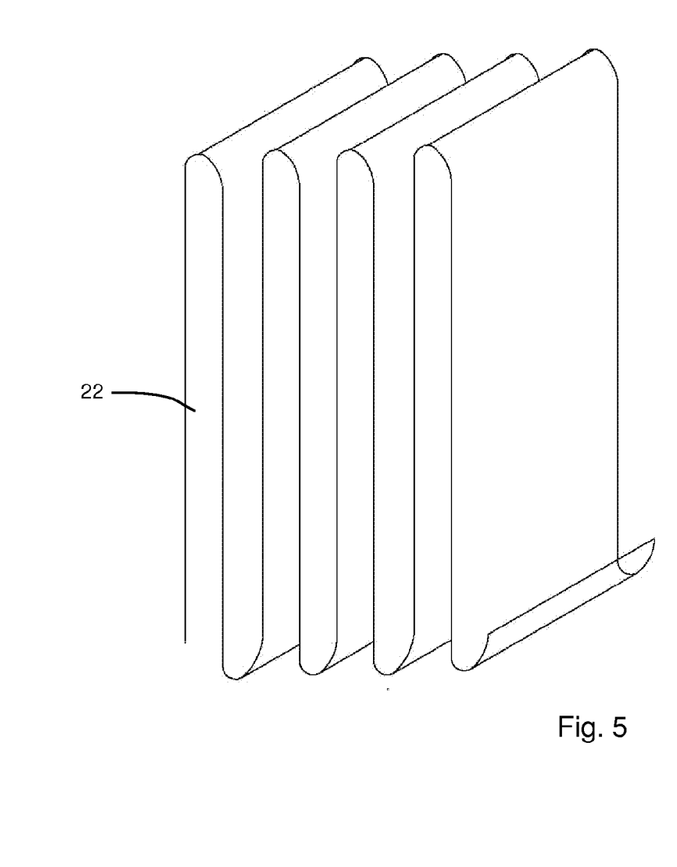
FIG. 5 is a perspective view of an elongated foil formed in a plurality of foil layers arranged in zigzag fashion, which foil comprises a heat conducting material.
Figure 13:
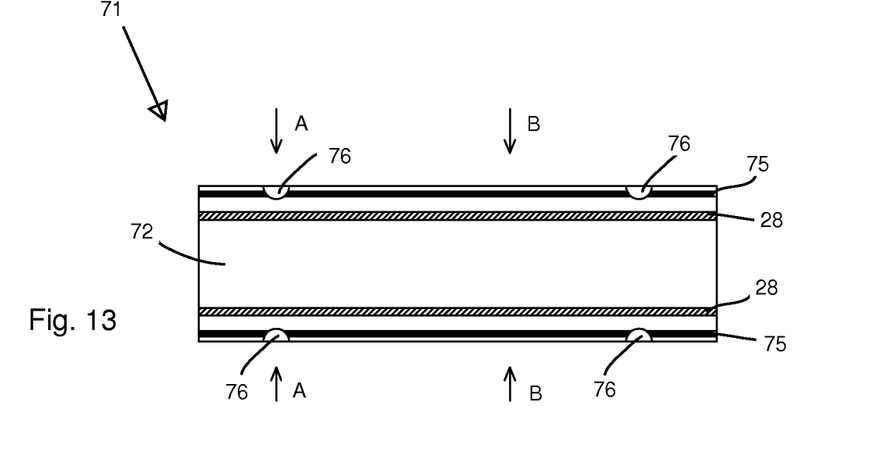
FIGS. 13 and 14 show a top plan view and two cross-sectional views, respectively, of a device according to the invention.
Figure 14:
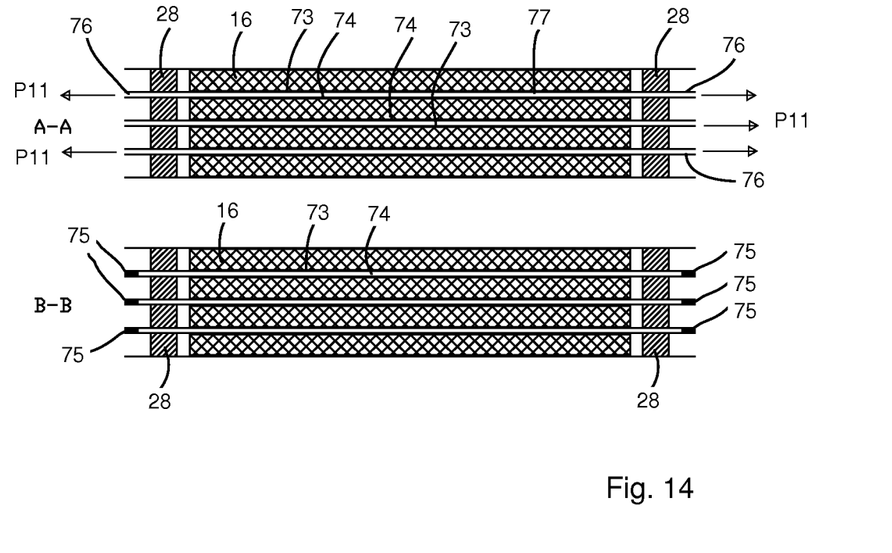

FIG. 5 shows another embodiment of a foil 22 comprising a plurality of foil layers arranged in zigzag fashion, which foil is made of a heat conducting foil or of a combination of a membrane foil and a heat conducting foil (see FIGS. 13 and 14).

The membrane foil may for example be a hydrophobic PFFE membrane foil having a thickness of 30-500 μm and a pore size of 0.1-0.45 μm or another hydrophobic or hydrophilic membrane foil. The heat conducting foil 22 may be a tri-laminate foil, for example, made up of a metal foil coated with plastic on two sides, said plastic comprising PET and said metal foil comprising aluminium. The thickness of the PET foil layer may be 12 μm, for example, whilst the aluminium foil may be 37 μm thick.

Figure 7:
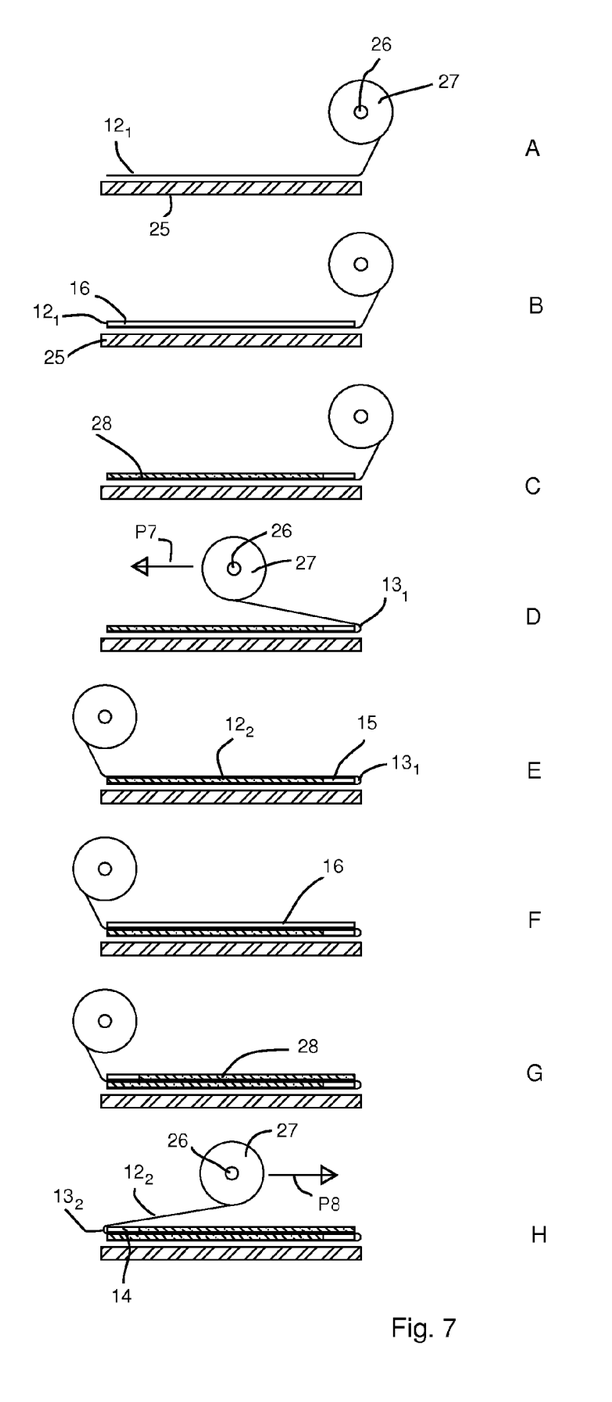
FIGS. 7A-7H show various steps of the method according to the invention.

FIGS. 7A-7H show seven steps of the method according to the invention, which is suitable for manufacturing the module 10 shown in FIG. 2 of the device 1. In the step shown in FIG. 7A, a first foil layer 12 is positioned on a support 25 from a roll 26 on which a foil 27 is wound. Then a mesh-like layer 16 is positioned on top of the foil layer $12_1$. Following that, an adhesive film 28 is applied along both longitudinal sides over the distance L (see FIGS. 3B, 3C) by means of an adhesive applicator, which adhesive film 28 extends up to a point spaced a predetermined distance from the first end 13 of the first foil layer $12_1$ (FIG. 7C). The adhesive layer comprises a cement, such as a silicone paste, a silicone hot melt or an epoxy resin. Following that, the roll 26 is moved in the direction indicated by the arrow P7, during which movement the foil 27 is unwound from the roll 26 and positioned on top of the mesh-like layer 16 on a side remote from the first foil layer $12_1$ (see FIGS. 7D, 7E). Thus the second foil layer $12_2$ has been formed. Then a mesh-like layer 16 is positioned on top of the second foil layer $12_2$ (FIG. 7F), whereupon an adhesive film 28 is applied over a distance L from the first end $13_1$ (FIG. 7G). Then the roll 26 is moved in the opposite direction of the arrow P7 towards the first end 13, during which movement the foil 27 is unwound from said roll 26, thus positioning the third foil layer $12_3$ on top of the mesh-like layer 16. At the same time, the passage 14 is formed (FIG. 7H). Then the steps shown in FIGS. 7A-7H are repeated a number of times until a module 10 comprising a desired number of layers $12_1 \ldots 12_n$ with mesh-like layers 16 present therebetween has been formed. The module 10 is then placed between two opposite plates 10, and the passages 14, 15 are connected to the fluid outlet openings 9 and 8, respectively. Located between the ends $13_1 \ldots 13_n$, near the passages 15, are passages which are connected to the fluid inlet opening 7. In a similar manner, passages located between the ends $13_2 \ldots 13_{n-1}$ present near the passages 14 are connected to the fluid inlet opening 6. The required seals can be realised by means of a silicone paste, for example.

In the device 1 shown in FIGS. 1-7, the foil layers $12_1 \ldots 12_n$ and the mesh-like layers 16 present therebetween extend parallel to each other and to a flat plane.

In the embodiments shown in FIGS. 8-10B of a device 31 according to the invention, the foil layers $12_1 \ldots 12_n$ and the mesh-like layers present therebetween extend from a central axis 32 of the cylindrical container to the outer side of the cylindrical container 33 to the outer side of the cylindrical container 33. In these embodiments, relatively high pressures can be used.

Figure 8:
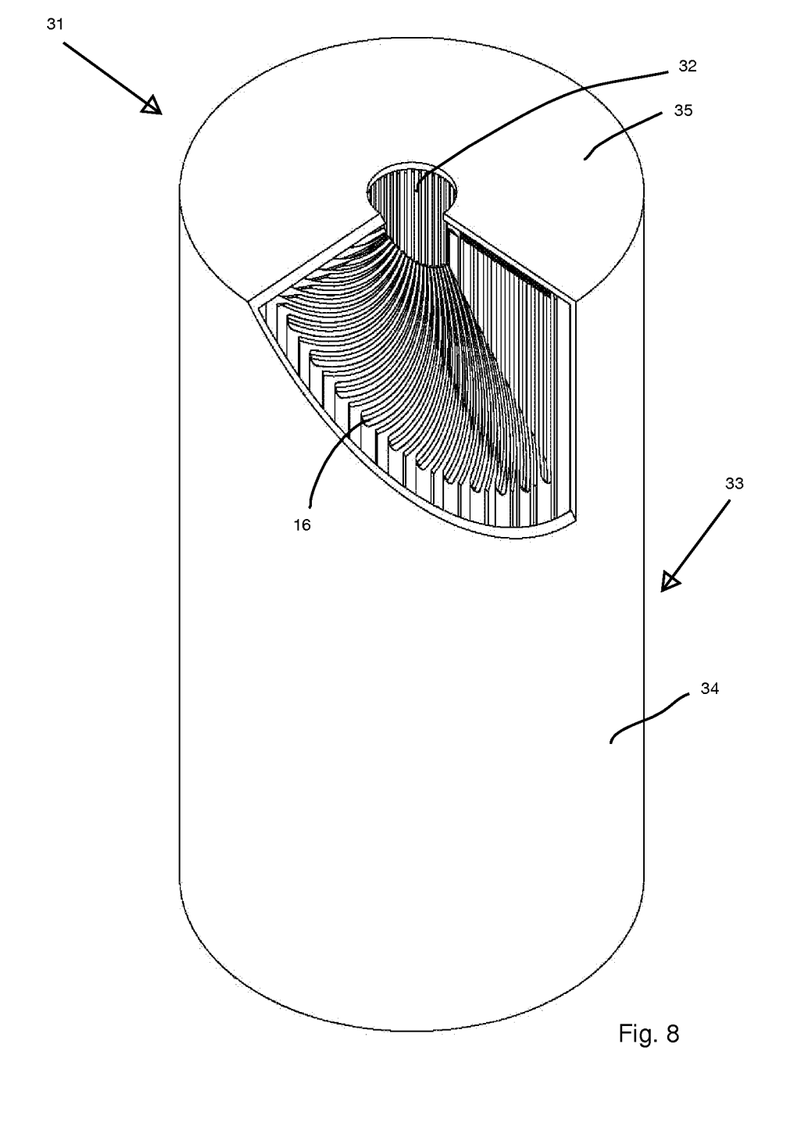

FIG. 8 shows a perspective, partially cutaway view of the device 31.

The device 31 comprises a cylindrical container 33, which comprises a cylindrical tube 34 which is closed at both ends by a disc-shaped cover 35, which is provided with fluid inlet and outlet openings.

Figures 9A, 9B:
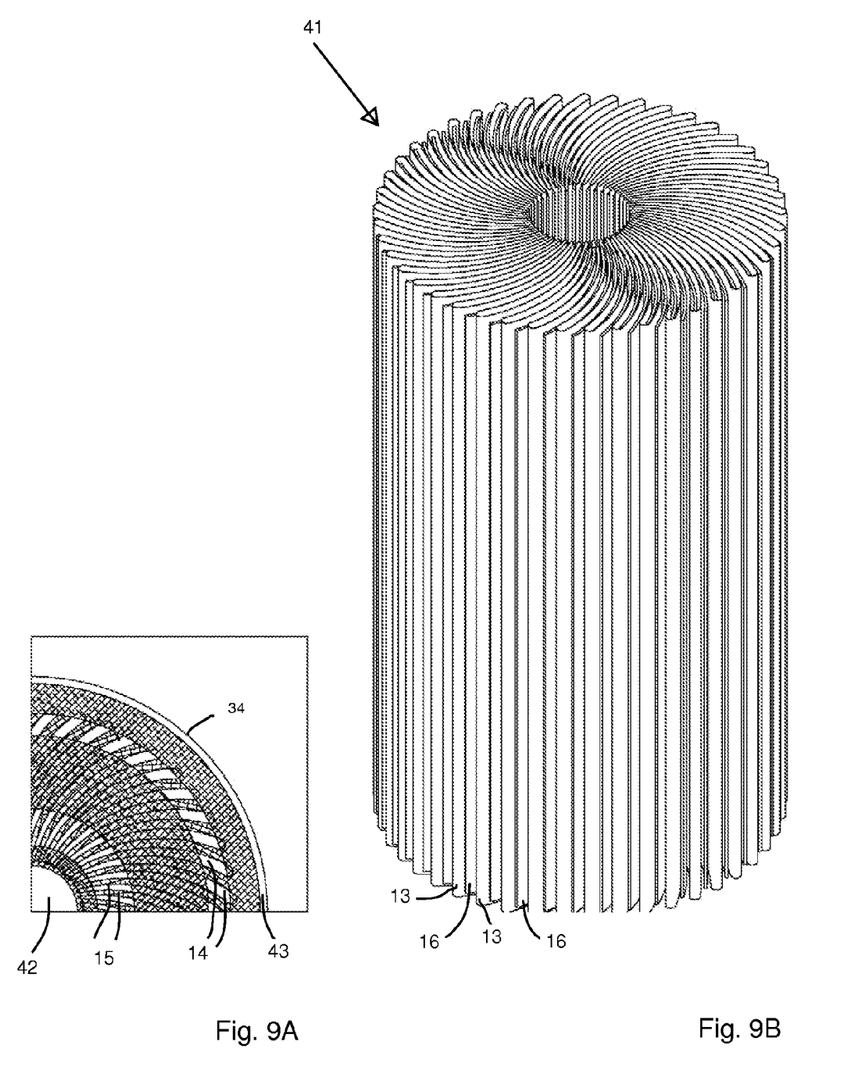

FIGS. 9A, 9B show an embodiment 41 of the device 31 shown in FIG. 8, in which the foil layers are interconnected by means of silicone paste at the short sides of the cylindrical container 33, in a manner practically identical to the manner shown in FIG. 3A, leaving open alternating passages 14, 15. A first fluid is introduced into the space present between the foil layers and the mesh-like layers 16 present therein via a central inlet opening 42 and discharged via the passages 14. A second fluid is supplied via a space 43 present between the outer side of the foil layers and the cylindrical tube 34 and discharged via the passages 15. The foil layers may comprise a non-permeable heat conducting foil, a membrane foil and/or a combination of a heat conducting foil with a hydrophobic membrane foil, etc.

Figures 10A, 10B:
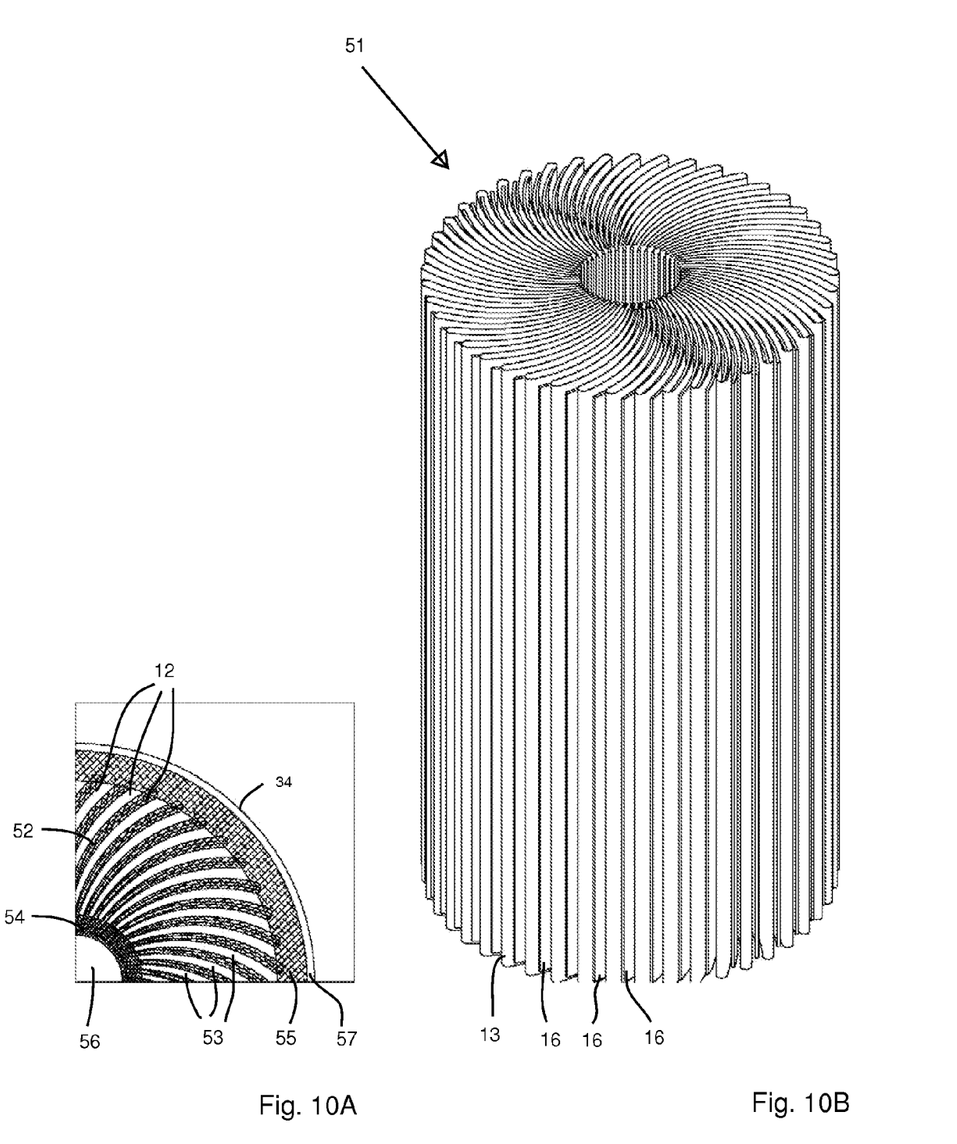

FIGS. 10A and 10B show another embodiment 51 of the device 31 shown in FIG. 8, in which foil layers 12 are alternately interconnected at the short sides over the entire distance from the centre to the outer side by means of silicone paste 52, whilst foil layers 12 present therebetween are not connected at all over the larger part of said distance, so that passages 53 are formed. To obtain a proper seal, the foil layers are interconnected both near the centre and near the outer edge and both near the upper side and near the bottom side by means of annular silicone bands 54, 55. The operation of the embodiment 51 is as follows. The foil layers 12 are formed of a membrane foil, and a first fluid is supplied via the passages 53. The permeate passes through the foil layers 12 and subsequently flows in radial direction to the central passage 56 and/or the passage 57 located near the cylindrical tube 34. The embodiment 51 is in particular suitable for filtration applications which require a high pressure, such as reverse osmosis (RO), for example.

Figure 11:
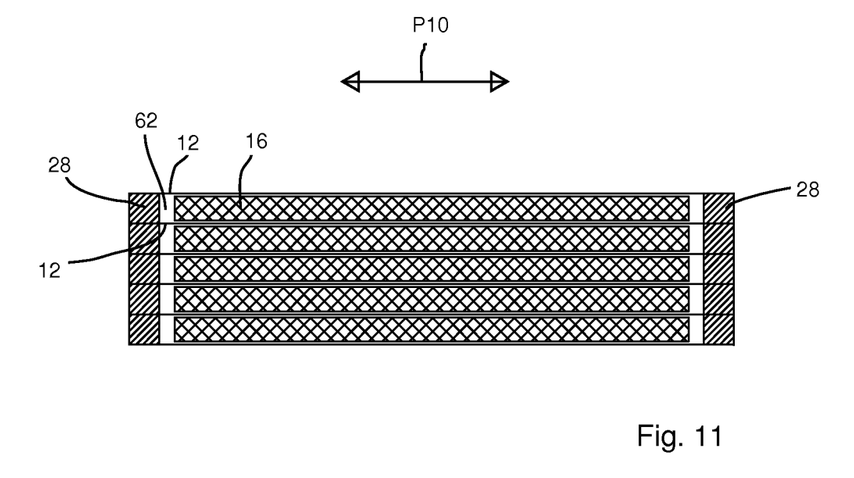
FIGS. 11 and 12 are cross-sectional views in the directions indicated D-D in FIG. 3A of two different embodiments of the device according to the invention.

FIG. 11 shows a cross-sectional view in the direction indicated by the arrows D-D in FIG. 3A, in which the foil layers 12 are interconnected over the desired distances by means of a silicone paste 28 on both longitudinal sides. As the figure clearly shows, the width of the mesh-like layer 16 is smaller than the distance between the bands of silicone paste 28 provided on either side, so that there is a small gap 62 between the mesh-like layer 16 and the silicone paste 28. Fluid flowing between the foil layers 12 will flow mainly through the mesh-like layer 16. Forces exerted by the fluid are taken up by the foil layers 12 and the silicone paste 28 in the transverse direction indicated by the double arrow P10 and the longitudinal direction of the foil layers 12. The forces exerted in a direction extending transversely thereto are taken up by the plates 2.

Figure 12:
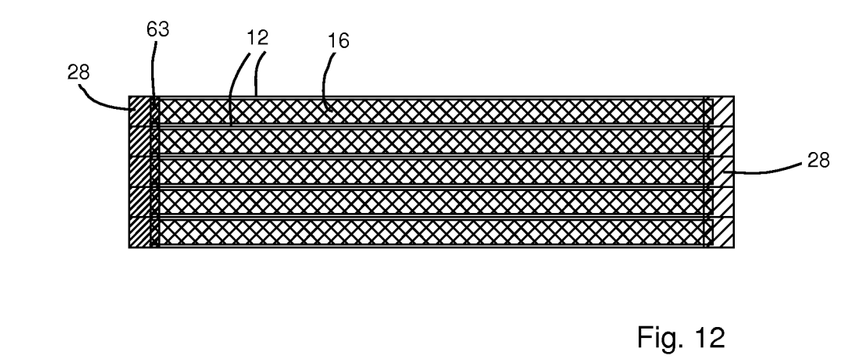

FIG. 12 is a cross-sectional view of another embodiment in the direction indicated by the arrows D-D in FIG. 3A, in which the width of the mesh-like layers 16 is such that also edges 63 of the mesh-like layers 16 are connected to the foil layers 12 upon application of the silicone paste 28. In use, fluid flowing between the foil layers 12 and through the mesh-like layers 16 will exert pressure inter alia in the direction indicated by the double arrow P10. The forces that occur are taken up by the relatively thin foil layers, but also, to a larger extent, by the mesh-like layers 16 and the silicone paste 28. In this way it is possible to realise a simple but very adequately functioning heat exchanger, filtering device or a combination thereof by means of the relatively thin foil layers 12, mesh-like layers 16 present therebetween and the pastes 28, for example a silicone paste.

For the sake of completeness it is noted that in the cross-sectional views shown in FIGS. 11 and 12, the mesh-like layer 16 is spaced from the foil layers 12. This is merely for the sake of clarity of the figures. In practice the foil layers 12 firmly abut against the mesh-like layer 16.

FIGS. 13 and 14 show another embodiment of a device 71 according to the invention, in which use is made of a combination of a membrane foil and a heat exchanger foil for the purpose of using the device as a membrane distillation device.

The foil 72 comprises a non-permeable heat conducting foil 73 and a membrane foil 74. The heat conducting foil 73 and the membrane foil 74 are interconnected along both longitudinal sides by means of, for example, a 5 mm wide and 0.1 mm thick a polyurethane solvent-based lacquer 75. Subsequently, a device as shown in FIGS. 2 and 3A-3C is realised in a similar manner as described above, with the zigzag foil layers being interconnected by means of silicone paste 28. Following that, recesses 76 extending the entire height of the device 71 are formed in a number of places in the polyurethane lacquer 75 and the foil 72. The recesses 76 form outlets of a distillate space 77 located between the heat conducting foil 73 and the membrane foil 74. The flow through the device 71 can take place in a similar manner as in the device shown in FIG. 2, except that in addition to that an additional flow in the direction indicated by the arrow P11 of distillate collected in the distillate space 77 via the membrane 74 is obtained.

The module 10 may have dimensions varying from, for example, 20×150×500 mm to, for example, 500×500×1500 mm.

The invention claimed is:

1. A device suitable for treating a fluid, which device comprises an elongated foil having a length with folds spaced along the length forming a plurality of foil layers arranged in zigzag fashion, a first foil layer being connected to a second foil layer at a first end, and said second foil layer being connected to a third foil layer at a second end remote from said first end, while spacers are arranged between said foil layers, which spacer comprises a mesh-like layer, through which fluid can flow in the plane of the mesh-like layer as well as transversely to the plane of the mesh-like layer, characterized in that longitudinal sides of the first foil layer and the second foil layer are interconnected from an end up to a point spaced a predetermined distance from the first end, leaving open a passage at the first end, while longitudinal sides of the second foil layer and the third foil layer are interconnected from the first end up to a point spaced a predetermined distance from the second end, leaving open a passage at the second end and wherein the first foil layer and the second foil layer are interconnected most of the distance between ends.

2. A device according to claim 1, characterized in that longitudinal sides of the foil layers arranged in zigzag fashion are connected to the mesh-like layer.

3. A device according to claim 1, characterized in that longitudinal sides of the first foil layer and the second foil layer are interconnected by means of a cement along at least part of a length.

4. A device according to claim 3, characterized in that longitudinal sides of the foil layers arranged in zigzag fashion are connected to the mesh-like layer.

5. A device according to claim 1, characterized in that the mesh-like layer extends over substantially the entire area of a foil layer.

6. A device according to claim 1, characterized in that a passage extending transversely to the longitudinal side is present between the first and the second foil layer near the second end.

7. A device according to claim 1, characterized in that the foil layers are disposed within a cylindrical container, with the first and the second end extending in axial direction, while the foil layers extend in spiral fashion from the first end located near the central axis of the cylindrical container to the second end spaced some distance from said central axis.

8. A device according to claim 1, characterized in that the foil comprises a membrane foil and a heat-conducting foil, which are interconnected by means of a cement along longitudinal sides thereof, while recesses are formed in said cement for the discharge of distillate.

9. A device according to claim 1, characterized in that the open passage at the first end is formed within one of the folds of the elongated foil.

10. A device according to claim 9, characterized in that the open passage at the second end is formed within another of the folds of the elongated foil.

* * * * *